United States Patent
Chambers et al.

(10) Patent No.: US 11,180,350 B2
(45) Date of Patent: *Nov. 23, 2021

(54) METHODS AND APPARATUS FOR CONSTRUCTING GLASS FURNACE STRUCTURES

(71) Applicant: FOSBEL, INC., Brook Park, OH (US)

(72) Inventors: Robert D. Chambers, Brook Park, OH (US); Michael P. Smith, Brook Park, OH (US); Alan E. Bowser, Jr., Brook Park, OH (US); Kevin D. Pendelton, Brook Park, OH (US); Lou Carolla, Brook Park, OH (US)

(73) Assignee: FOSBEL, INC., Brook Park, OH (US)

( * ) Notice: Subject to any disclaimer, the term of this patent is extended or adjusted under 35 U.S.C. 154(b) by 143 days.

This patent is subject to a terminal disclaimer.

(21) Appl. No.: 16/262,171

(22) Filed: Jan. 30, 2019

(65) Prior Publication Data

US 2019/0161325 A1    May 30, 2019

Related U.S. Application Data

(63) Continuation of application No. 14/859,820, filed on Sep. 21, 2015, now Pat. No. 10,227,220.

(Continued)

(30) Foreign Application Priority Data

Feb. 25, 2015 (GB) ..................... 1503121

(51) Int. Cl.
  *C03B 5/027* (2006.01)
  *B66C 17/06* (2006.01)
  (Continued)

(52) U.S. Cl.
  CPC ............... *B66C 17/06* (2013.01); *B66B 9/16* (2013.01); *B66C 23/205* (2013.01);
  (Continued)

(58) Field of Classification Search
  CPC ......... C03B 5/237; C03B 5/2375; C03B 5/42; C03B 5/43; B66C 17/06; B66C 23/205;
  (Continued)

(56) References Cited

U.S. PATENT DOCUMENTS

| 1,320,386 A | 11/1919 | Griggs |
| 1,320,387 A | 11/1919 | Griggs |

(Continued)

FOREIGN PATENT DOCUMENTS

| CN | 2095715 | 5/2007 |
| CN | 203474296 | 3/2014 |

(Continued)

OTHER PUBLICATIONS

Search Report for GB 1500698.4, dated Jul. 6, 2015, 1 page.
International Search Report and Written Opinion, PCT/US2-15/051141, dated Feb. 24, 2016.

*Primary Examiner* — Hung D Nguyen
(74) *Attorney, Agent, or Firm* — Nixon & Vanderhye P.C.

(57) ABSTRACT

Methods and apparatus for constructing refractory structures, e.g., glass furnace regenerator structures and/or glass furnace structures having walls formed of refractory block and buck stays externally supporting the walls are provided. Opposed pairs of supports are connected to at least a respective one of the vertically oriented buck stays with cross-support beams spanning the refractory structure between a respective pair of the supports. An overhead crane assembly is supported by the cross-support beams. In such a manner, refractory components of the refractory structure (Continued)

(e.g., refractory wall blocks and/or refractory checker bricks) may be installed using the overhead crane assembly.

15 Claims, 13 Drawing Sheets

Related U.S. Application Data

(60) Provisional application No. 62/053,403, filed on Sep. 22, 2014, provisional application No. 62/111,275, filed on Feb. 3, 2015.

(51) Int. Cl.
  *C03B 5/42* (2006.01)
  *C03B 5/237* (2006.01)
  *B66B 9/16* (2006.01)
  *B66C 23/20* (2006.01)
  *F27D 1/00* (2006.01)
  *F27D 17/00* (2006.01)

(52) U.S. Cl.
  CPC ............ *C03B 5/2375* (2013.01); *C03B 5/42* (2013.01); *F27D 2001/005* (2013.01); *F27D 2001/0056* (2013.01); *F27D 2001/0079* (2013.01); *F27D 2017/007* (2013.01); *F27D 2201/00* (2013.01)

(58) Field of Classification Search
  CPC . B66B 9/16; F27D 2201/00; F27D 2001/005; F27D 2001/0056; F27D 2001/0079; F27D 2001/0089; F27D 2017/007; F27D 1/00; F27D 1/0006; F27D 1/0021; F27D 1/0023; F27D 1/0026; F27D 1/004; F27D 1/0043; F27D 1/02; F27D 1/027; F27D 1/028; F27D 1/045; F27D 1/08; F27D 1/10; F27D 1/14; F27D 1/1621; F27D 1/626; F27B 3/10; F27B 3/12; F27B 3/14; F27B 3/16; F27B 3/20
  USPC .......... 373/26, 30, 60, 71, 72, 73, 74, 75, 76
  See application file for complete search history.

(56) References Cited

U.S. PATENT DOCUMENTS

| | | | | |
|---|---|---|---|---|
| 1,639,138 | A | * | 8/1927 | Liptak ............... F27D 1/004 52/506.04 |
| 2,281,951 | A | * | 5/1942 | Schroeder ............ F27D 1/004 52/479 |
| 2,585,238 | A | | 1/1952 | Dobson |
| 3,049,200 | A | * | 8/1962 | Gordon ................ F27D 1/00 52/348 |
| 3,072,080 | A | | 1/1963 | McLain |
| 3,203,376 | A | * | 8/1965 | Engelhardt ........... F23M 5/08 110/317 |
| 3,203,682 | A | * | 8/1965 | Kerin ................. F27B 3/14 110/175 R |
| 3,326,541 | A | | 6/1967 | Davies et al. |
| 3,339,046 | A | | 8/1967 | Giammona et al. |
| 3,379,177 | A | * | 4/1968 | Stalph ............... F22B 37/208 122/6 A |
| 3,869,996 | A | * | 3/1975 | Panferov ............. F23M 5/06 110/335 |
| 4,137,037 | A | | 1/1979 | Daman et al. |
| 4,219,326 | A | * | 8/1980 | Walton ................ C03B 5/04 65/339 |
| 4,240,234 | A | * | 12/1980 | Eisinger ............. F22B 37/208 122/6 A |
| 4,369,032 | A | * | 1/1983 | Lowrance, II ...... F27B 17/0016 110/336 |
| 5,645,395 | A | | 7/1997 | Huang |
| 6,036,079 | A | | 3/2000 | Nestler |
| 6,814,012 | B2 | * | 11/2004 | McCaffrey ........... F27B 3/16 110/337 |
| 7,827,689 | B2 | | 11/2010 | Crane |
| 2008/0169578 | A1 | | 7/2008 | Crane |
| 2011/0291310 | A1 | | 12/2011 | Degollado et al. |
| 2016/0137540 | A1 | | 5/2016 | Bowser, Jr. |
| 2016/0221801 | A1 | | 8/2016 | Carolla |
| 2016/0221854 | A1 | | 8/2016 | Carolla |

FOREIGN PATENT DOCUMENTS

| | | |
|---|---|---|
| CN | 103884184 | 6/2014 |
| CN | 203772011 | 8/2014 |
| JP | 2012-127593 | 7/2012 |
| WO | 2012/078036 | 6/2012 |

\* cited by examiner

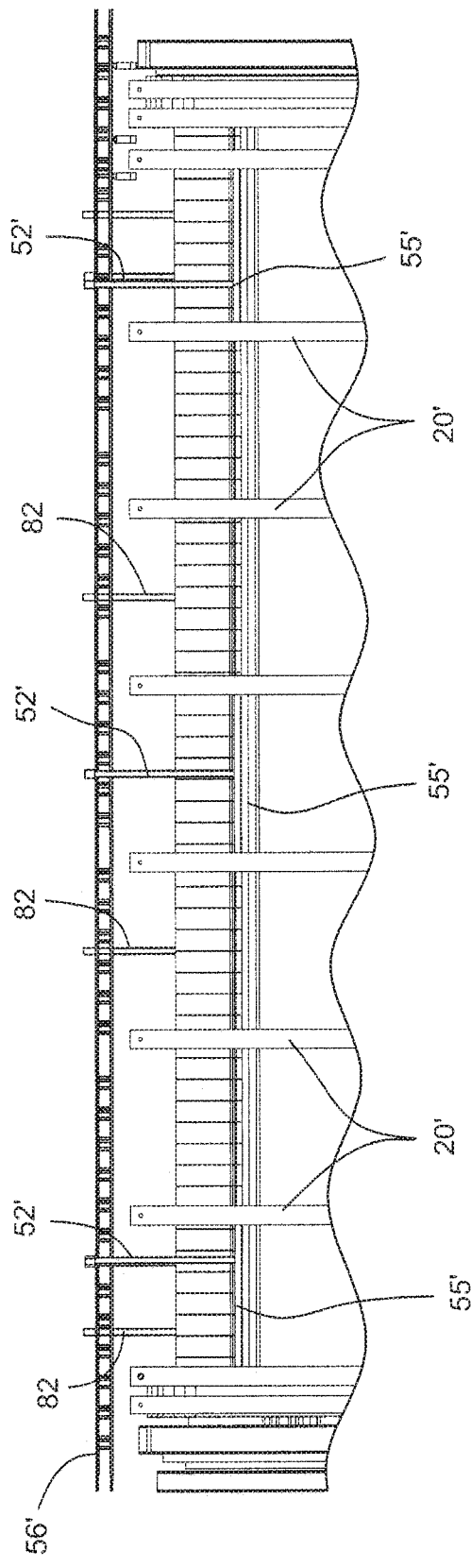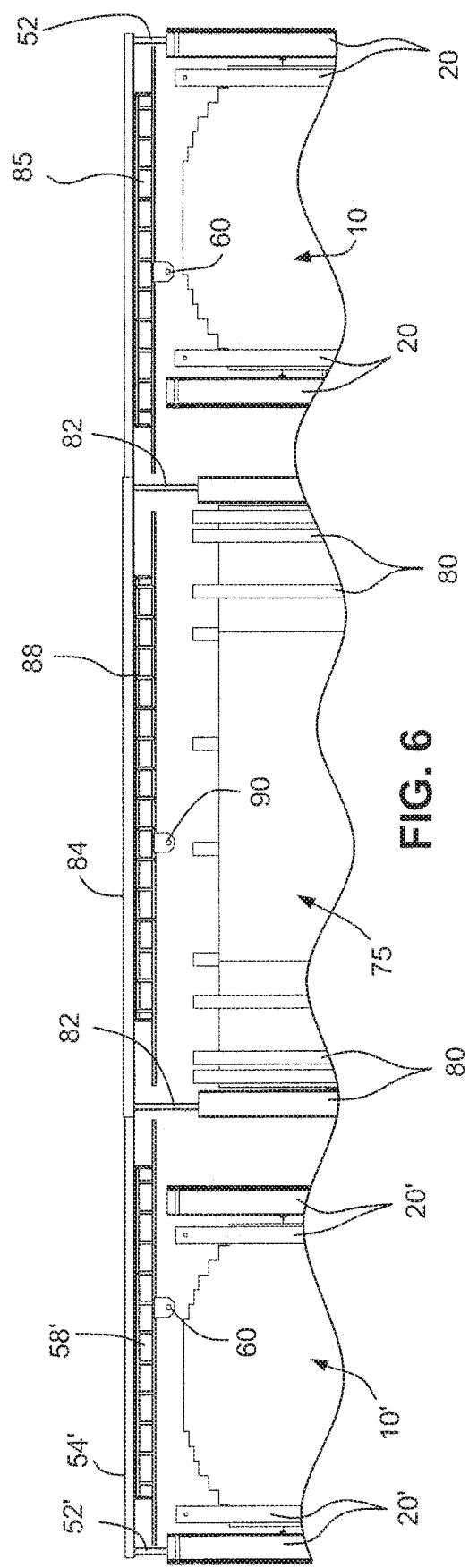

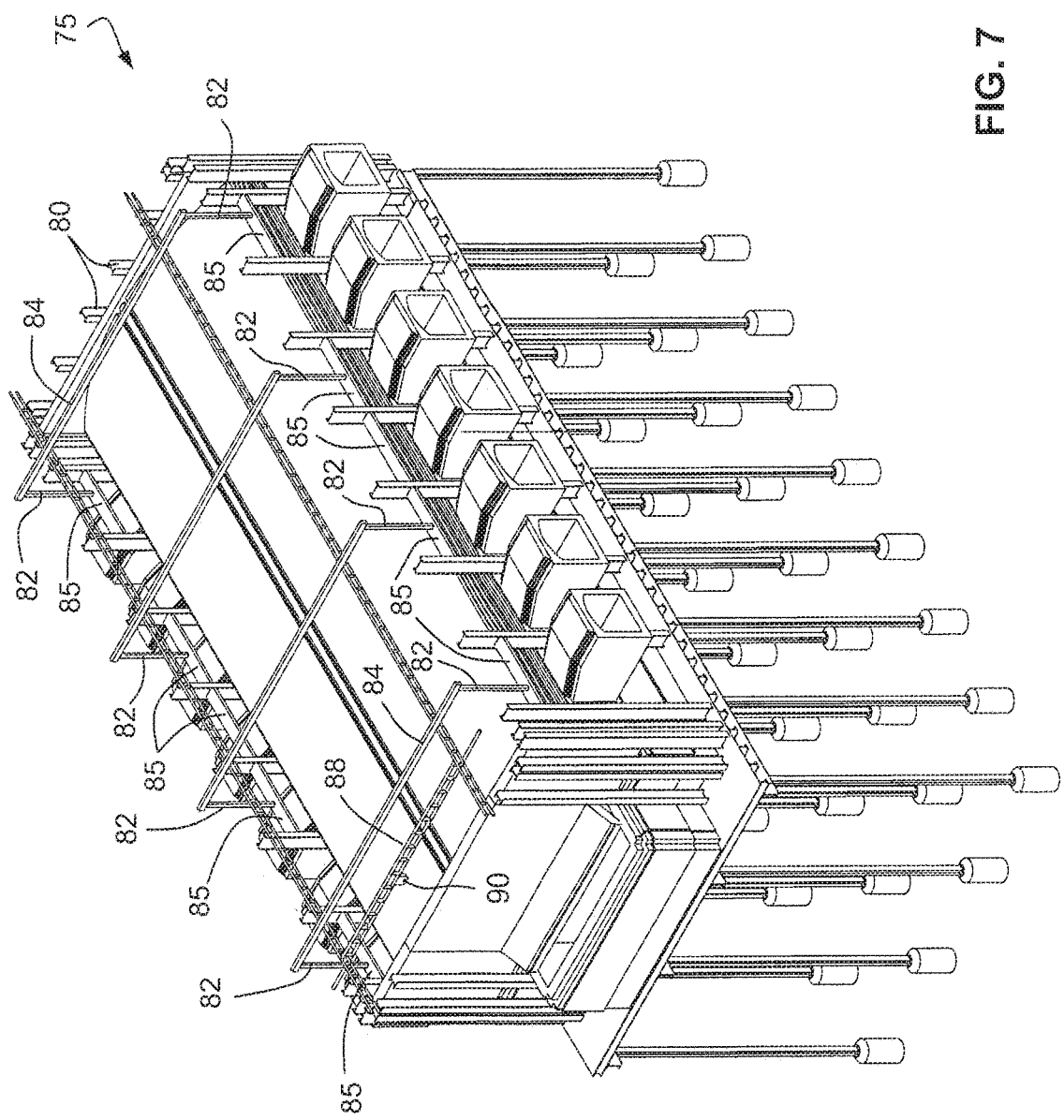

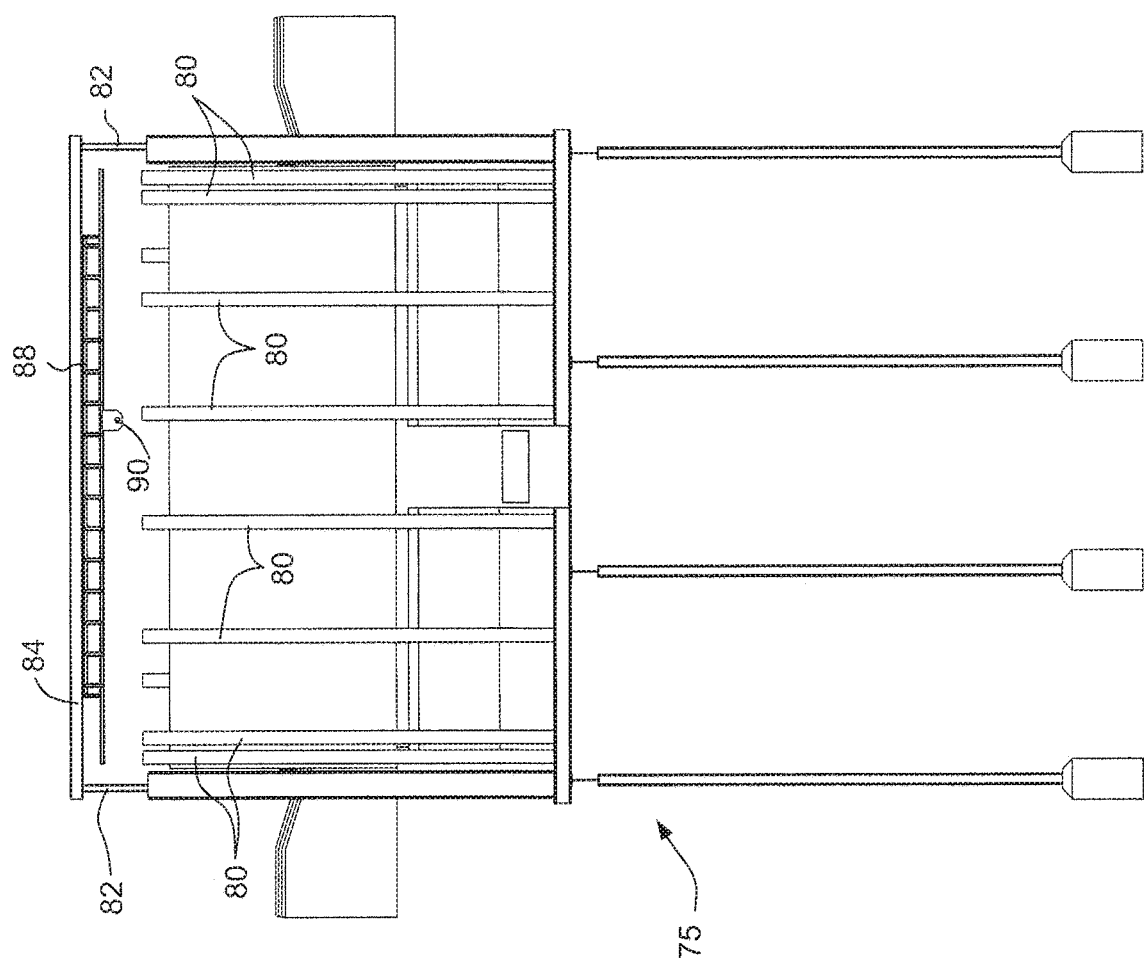

METHODS AND APPARATUS FOR CONSTRUCTING GLASS FURNACE STRUCTURES

CROSS-REFERENCE TO RELATED APPLICATIONS

This application is a continuation of commonly owned U.S. application Ser. No. 14/859,820, filed Sep. 21, 2015 (now U.S. Pat. No. 10,227,220), which is based on and claims domestic priority benefits under 35 USC § 119(e) from U.S. Provisional Application Ser. No. 62/111,275 filed on Feb. 3, 2015 and 62/053,403 filed on Sep. 22, 2014, and also claims foreign priority benefits under 35 USC § 119(a) from GB 1503121.4 filed on Feb. 25, 2015, the entire content of each such prior filed application being expressly incorporated hereinto by reference.

FIELD

The embodiments disclosed herein relate generally to methods and apparatus for constructing refractory structures associated with glass furnaces.

BACKGROUND

In the manufacturing process for making glass, raw materials including sand, lime, soda ash and other ingredients are fed into a furnace, sometimes called a glass tank. The raw materials are subjected to temperature above about 2,800° F. in the glass furnace which causes the raw materials to melt and thereby form a molten bed of glass that exits the glass furnace for further downstream processing into glass products.

The most common way of heating the glass furnace is through the combustion of a hydrocarbon fuel source, such as natural gas or oil. The hydrocarbon fuel is mixed with combustion air inside the furnace and combusted to thereby transfer the combustion heat energy to the raw materials and glass melt prior to exiting the furnace.

In order to improve the thermal efficiency of the combustion process, the combustion air used to combust the fuel is preheated by means of regenerator structures. More specifically, a supply of combustion air is preheated in a honeycombed pack of checker bricks contained within the interior of the regenerator structure. Fresh combustion air is drawn up through the pack of heated checker bricks in the regenerator structure and preheated by means of heat transfer. The pre-heated combustion air may then be mixed with the fuel, combusted. Waste combustion gas exits the glass furnace and passes through a second regenerator structure. As the waste gasses pass through the second regenerator the checkers in the pack are heated by means of heat transferred from the waste gas. After a predetermined time has elapsed (e.g., after about 15-30 minutes), the process cycle is reversed so that the checker bricks in one of the regenerator structures that were being heated by heat transfer with the waste gas are then used to preheat the fresh combustion air while the checker bricks in the other regenerator structures that were used to preheat the combustion air are then re-heated by heat transfer with the waste combustion gas. See in this regard, U.S. Pat. No. 3,326,541 (the entire content of which is expressly incorporated hereinto by reference).

The current process for building glass furnace refractory structures, e.g., regenerators, glass furnaces, fore hearths and the like, is very labor intensive taking many weeks as it requires the placement of hundreds of thousands of refractory bricks that may be individually coated with mortar and positioned or in some cases essentially dry set with minimal (if any) mortar. As is well known in the glass making industry, the joints associated with the bricks of the furnace refractory structures are the weakest part of the structure and are consequently more readily susceptible to degradation by the corrosive hot gasses passing therethrough. As the brick joints begin to erode, the walls forming the refractory structure face increased attack as the corrosive gasses begin to condense and dissolve the refractory materials forming the bricks thereby weakening the structure. As the structure becomes weakened, the glass furnace itself may become compromised and fail which could then require a complete shut down and rebuilding operation.

It can be appreciated therefore, that if the refractory structures could be fabricated from larger refractory blocks, then fewer joints would ensue thereby prolonging the regenerator structure's useful life and minimizing down time due to rebuilding. However, while large refractory blocks can be fabricated by pressing, molding or casting a refractory material, it is problematic to install such blocks during construction of a large-scale refractory structure.

In addition to the problems noted above, many of the components of the refractory structure, e.g., checker bricks used in glass regenerator structures, need to be replaced near or at the end of their useful life in order to maintain optimal production efficiencies. It is currently difficult to replace such components, e.g., the checker bricks, when it may be desired for them to do so.

What has been needed therefore are improvements in apparatus and methods whereby refractory structures may be efficiently and economically constructed and/or re-built. It is towards providing such improvements that the embodiments of the present invention are directed.

SUMMARY

In general, the embodiments disclosed herein are directed toward methods and apparatus for constructing a refractory structures, e.g., glass furnace regenerators, glass furnace systems such as glass furnace refiners, and the like having walls formed of refractory block and buck stays externally supporting the walls. According to one embodiment, the apparatus includes opposed pairs of supports connected to at least a respective one of the vertically oriented buck stays, cross-support beams spanning the refractory structure between a respective pair of the supports, and an overhead crane assembly supported by the cross-support beams.

The pairs of supports may comprise a plurality of foundation beams rigidly installed between respective adjacent pairs of buck stays and pairs of upright support beams each supported by a respective one of the foundation beams. According to other embodiments, the pairs of supports may comprise an arch support extending between and connected to an adjacent pair of the buck stays, wherein the cross-support beams are attached to an apex of the arch support. Alternatively or additionally, the pairs of supports may comprise a pair of upwardly convergent supports extending between and connected to an adjacent pair of the buck stays, wherein the cross-support beams are attached to an apex of the convergent supports.

In some embodiments the apparatus further comprises buck stay extension members rigidly connected to an upper terminal end of predetermined buck stays, and cross-support beams spanning the refractory structure between respective pairs of the buck stay extension members.

In some embodiments the hoist assembly comprises a monorail attached to predetermined ones of the buck stays. The monorail may be rigidly connected to an inboard surface of the predetermined ones of the buck stays.

In some embodiments the apparatus further comprises a hanger member having one leg attached rigidly to the predetermined ones of the buck stays, and another leg rigidly attached to the monorail. The hanger member may be generally U-shaped.

The overhead crane assembly may comprise a raceway beam longitudinally extending relative to the refractory structure and dependently supported by the cross-support beams, and a hoist assembly moveably mounted to the raceway beam. According to certain embodiments, the overhead crane assembly may comprise a pair of the raceway beams, and a bridge beam moveable mounted to the pair of raceway beams for reciprocal movements therealong in a longitudinal direction of the refractory structure. The hoist assembly may thus be moveably mounted to the bridge beam for reciprocal movements therealong in a latitudinal direction of the refractory structure.

One end portion of the raceway beams may be supported in a cantilever manner according to some embodiments by a respective pair of support beams and cross-support beam and so as to extend beyond a respective end of the regenerator structure.

The regenerator structure may further include a port and an operator platform below the port. In such embodiments, the foundation beams may be rigidly positioned between the respective pairs of buck stays at or above the operator platform.

According to other embodiments, a method for constructing a regenerator structure is provided by (i) connecting opposed pairs of supports to a respective one of vertically oriented buck stays, (ii) latitudinally spanning the refractory structure with cross-support beams connected between respective pairs of the upright supports, and (iii) supporting an overhead crane assembly by the cross-support beams.

Step (i) may include (ia) rigidly installing a plurality of foundation beams between respective adjacent pairs of buck stays, and (ib) supporting pairs of upright support beams by a respective one of the foundation beams. Alternatively or additionally, step (i) may comprise extending and connecting arch supports between adjacent pairs of the buck stays, and attaching the cross-support beams to an apex of a respective one of the arch supports. Other embodiments may include extending and connecting pairs of upwardly convergent supports between an adjacent pair of the buck stays, and attaching the cross-support beams to an apex of a respective one of the convergent supports.

In some embodiments of the method the refractory structure is a glass furnace regenerator structure having walls comprised of refractory blocks and an interior comprised of checker bricks, and wherein the method further comprises operating the overhead crane assembly so as to position the refractory blocks and/or the checker bricks.

According to embodiments, the overhead crane assembly will be provided by (a) installing a pair of raceway beams which longitudinally extend relative to the refractory structure and are dependently supported by the cross-support beams; (b) moveably mounting a bridge beam to the pair of raceway beams for reciprocal movements therealong in a longitudinal direction of the refractory structure; and (c) moveably mounting a hoist to the bridge beam for reciprocal movements therealong in a latitudinal direction of the refractory structure.

The raceway beams may be installed in such a manner that one end portion of the raceway beams is supported in a cantilever manner by a respective pair of support beams and a cross-support beam to thereby cause the one end of the raceway beams to extend beyond a respective end of the refractory structure. Additionally or alternatively, the foundation beams are installed at a position between the respective pairs of buck stays which is at or above an operator platform.

In some embodiments the refractory structure further includes a port and an operator platform below the port, and step (a) comprises rigidly installing the foundation beams at a position between the respective pairs of buck stays which is at or above the operator platform These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

FIGS. 5 and 6 are a side and end elevational views, respectively, of the upper portion of the glass furnace system depicted in FIG. 4;

FIG. 7 is a perspective view of the glass furnace section of the system depicted in FIG. 4;

FIG. 8 is an end elevational view of the glass furnace section depicted in FIG. 7;

DETAILED DESCRIPTION

Figure 1:
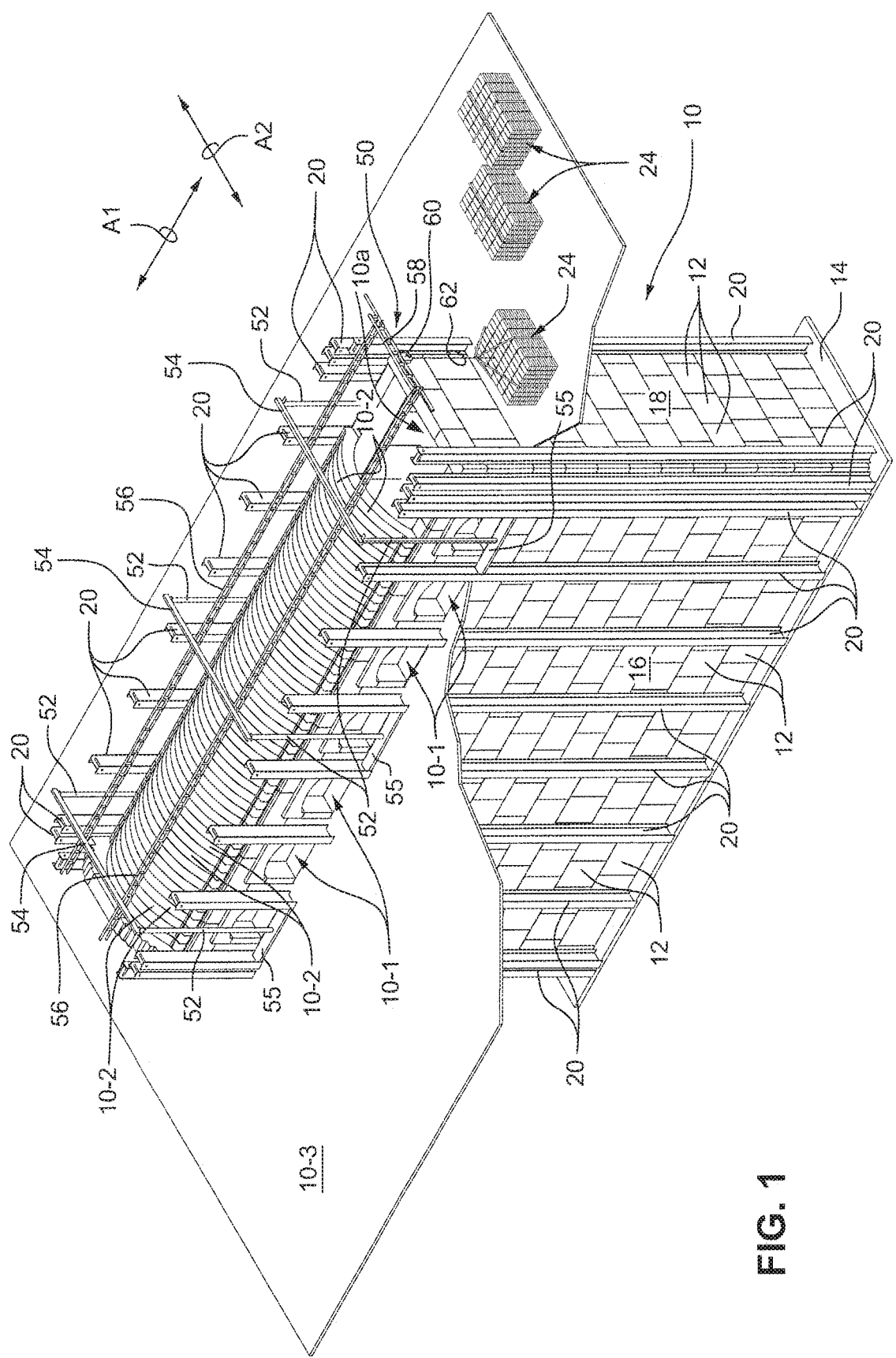
FIG. 1 is a perspective view of a regenerator structure showing an apparatus in accordance with an embodiment of the present invention.

Accompanying FIG. 1 schematically depicts a perspective view of a regenerator structure 10 showing an overhead crane apparatus 50 in accordance with an embodiment of the present invention. As shown, the regenerator structure 10 is constructed of large pre-cast refractor blocks (a few of which are identified by reference numeral 12) stacked on a foundation 14 to thereby form side and end walls 16, 18, respectively. It will be appreciated that the regenerator structure 10 is used in operative combination with a glass furnace (not shown). The regenerator structure 10 generally depicted in the accompanying FIGURES is of a type used for side-fired glass furnaces. However, the attributes of the embodiments of the invention to be described herein are equally applicable to other glass furnace designs, e.g. end-fired glass furnaces.

Figure 3A:
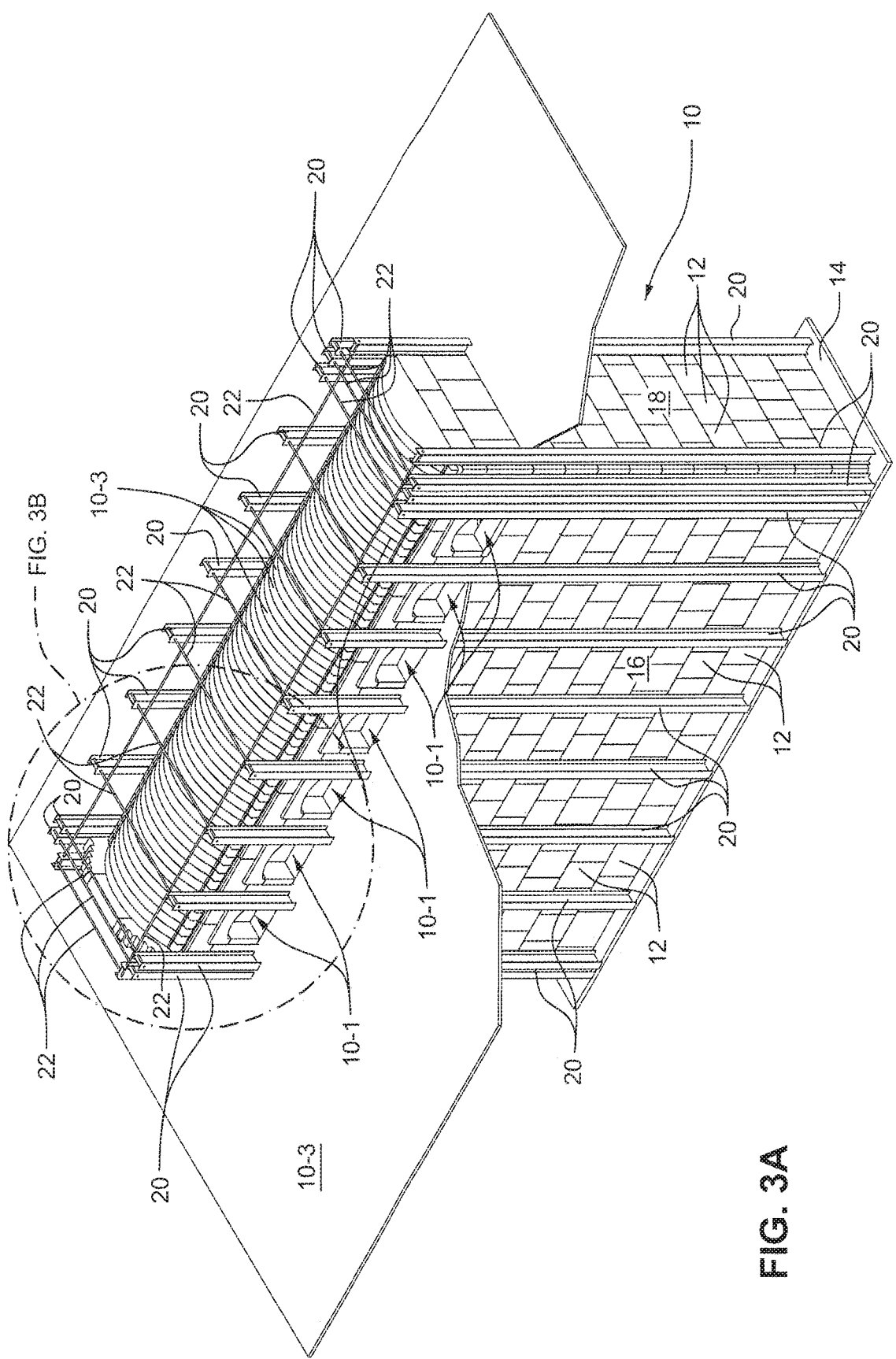
FIG. 3A is a perspective view of a regenerator structure prior to installation of apparatus in accordance with an embodiment of the present invention.
Figure 3B:
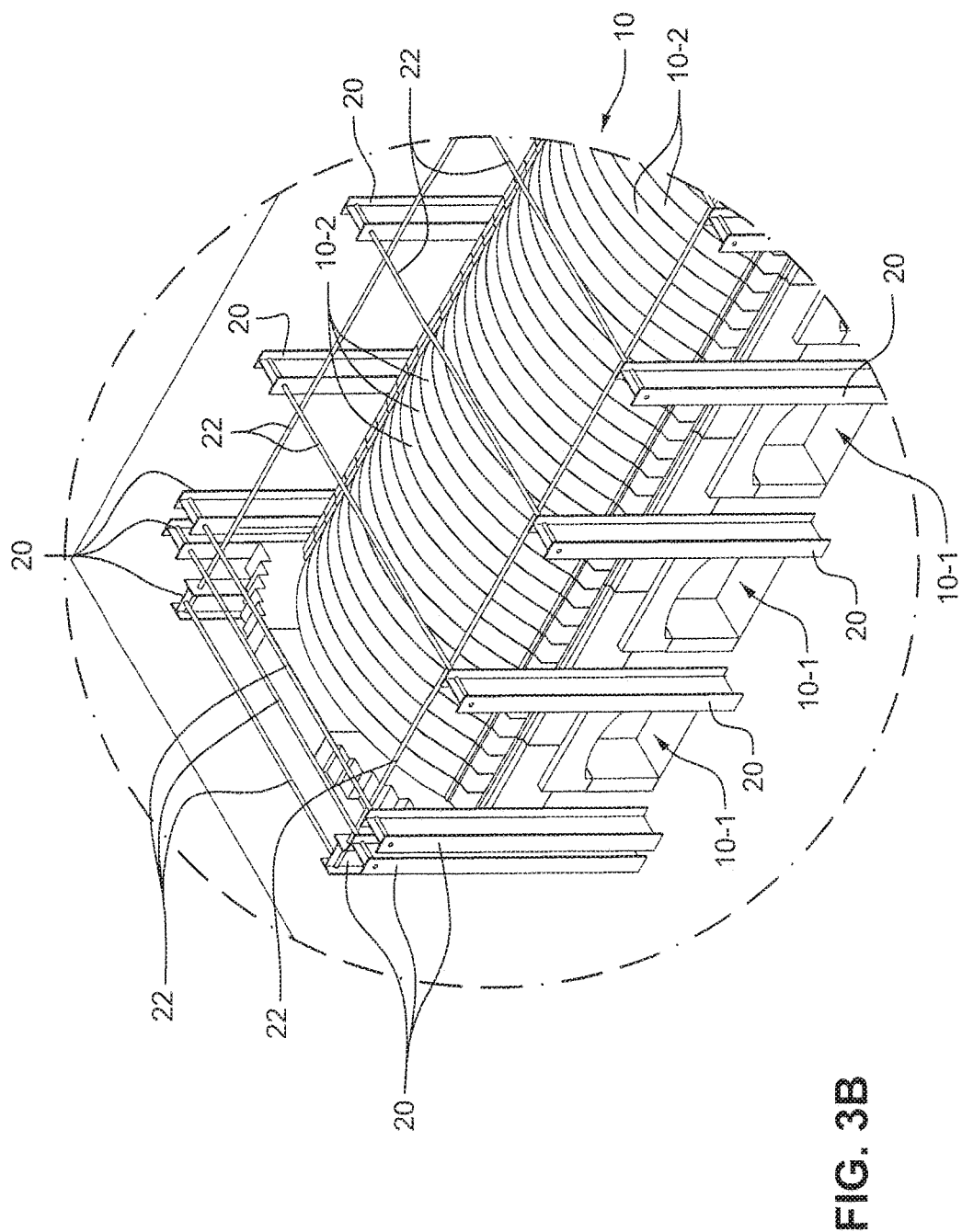
FIG. 3B is an enlarged perspective view of an end of the regenerator structure depicted in FIG. 3A.

The regenerator structure 10 includes a series of ports 10-1 which are used to introduce pre-heated combustion air into the glass furnace (not shown) or to exhaust combustion gas from the furnace depending on the operational cycle. The top of the regenerator structure 10 is capped with crowns (a representative few of which are noted by reference numeral 10-2). An operator platform 10-3 typically is provided near the ports 10-1. The walls 16, 18 are structurally supported by external upright structural beams known colloquially as buck stays 20. As is shown in FIGS. 3A and 3B, the buck stays 20 are compressively held against the walls by means of tie rods 22 extending between opposed pairs of buck stays 20 both latitudinally and longitudinally relative to the regenerator structure 10.

FIG. 1 depicts a state whereby the walls 16, 18 have been constructed of relatively large monolithic refractory blocks 12 and the checker bricks (a supply of which stacked on the platform 10-3 is denoted in FIG. 1 by reference numeral 24) are being stacked within the interior space of the regenerator structure 10. The apparatus 50 in the state shown in FIG. 1 has thus been employed to install the refractory blocks 12 when forming the walls 16, 18 and is thereby in the process of installing the checker bricks 24 within the interior defined by such walls 16, 18. For this reason, a few of the crowns 10-2 have not yet been installed at one end of the regenerator structure 10 so as to permit access into its interior space.

The overhead crane apparatus 50 in accordance with an embodiment of the invention is depicted as including laterally spaced-apart upright pairs of upright support beams 52 and a cross-support beam 54 spanning the distance therebetween. A foundation beam 55 extends between and is rigidly attached (e.g., by welding) to an adjacent pair of buck stays 20 so as to structurally support the upright and cross-support beams 52, 54. Each of the foundation beams 55 is most preferably connected between the adjacent pair of buck stays 20 at or just above the platform 10-3.

Figure 2:
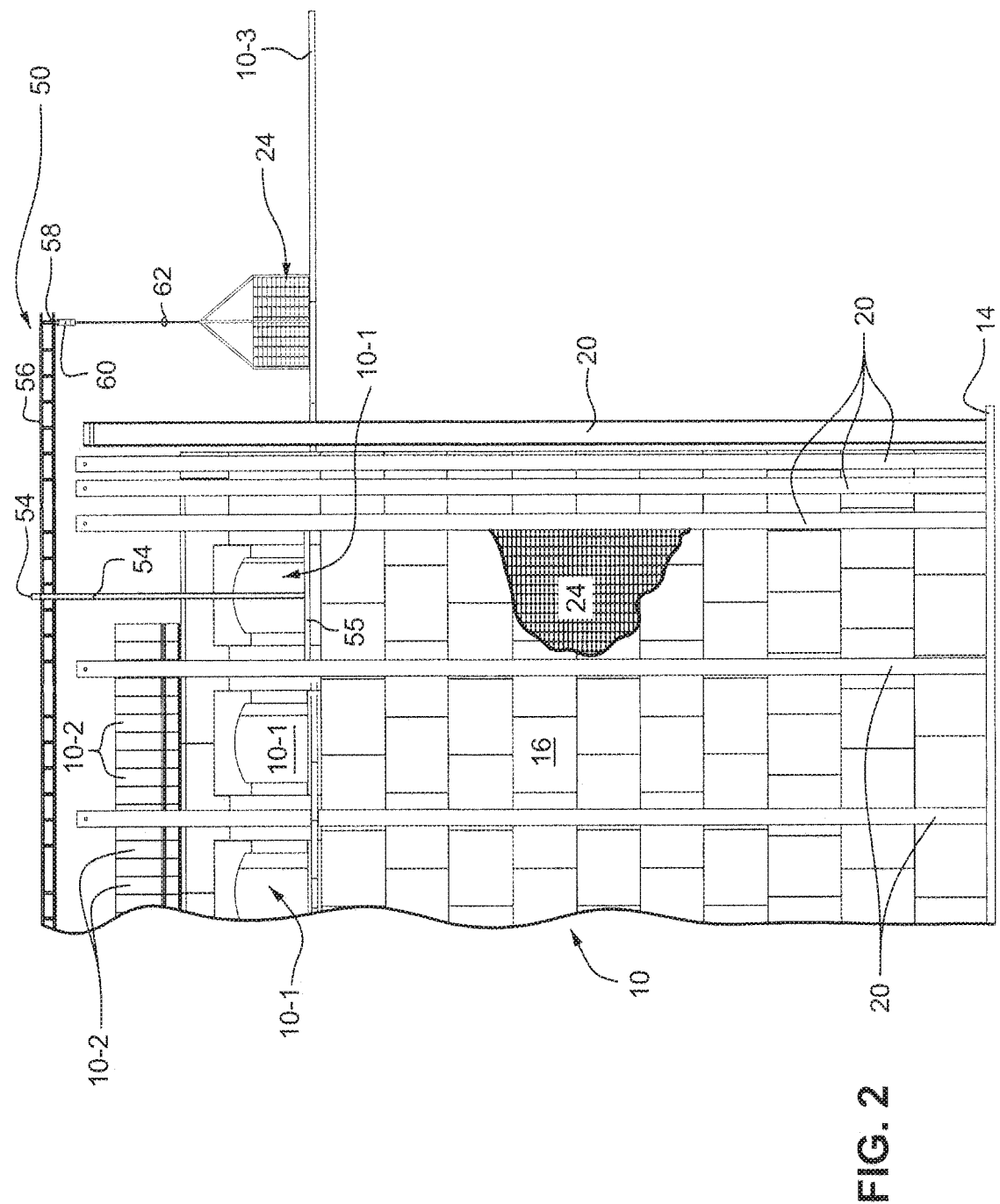
FIG. 2 is a partial end elevation view of the regenerator structure as depicted in FIG. 1.

The cross-support beams 52, 54 dependently support a pair of runway beams 56 between which is connected a travelling bridge beam 58. The bridge beam 58 includes an overhead travelling hoist 60. As is shown in FIG. 2, the runway beams 56 are supported in a cantilever manner by the end-most upright and cross-support beams 52, 54 to that the terminal end portions extend beyond the wall 18 of the regenerator structure 10 thereby enabling access to the stacked supply of checker bricks 24 on the platform 10-3.

Suitable operator controlled motors (not shown) are provided with the bridge beam 58 to allow it to reciprocally travel along the runway beams 56 in a longitudinal direction of the regenerator structure (i.e., in the direction of arrow A1 in FIG. 1). Similarly, operator controlled motors (not shown) are provided with the hoist 60 to allow it to travel reciprocally along the bridge beam in a latitudinal direction of the regenerator structure 10 (i.e., in a direction of arrow A2 in FIG. 1). The hoist 60 is connected to a suitable lifting sling 62 to allow the stacked supply of checker bricks 24 to be lifted up and into the interior of the regenerator structure 10, e.g., by suitably operating the bridge beam 58 and hoist 60 so as to travel in the directions of arrows A1 and A2 while simultaneously causing the hoist 62 to raise or lower the checker bricks 24 (i.e., in a direction transverse to arrows A1 and A2). In such a manner, therefore, the checker bricks within the regenerator structure 10 may be replaced. It will be appreciated that the operation as described above will also allow the refractory blocks 12 to be installed as may be needed.

Figure 3C:
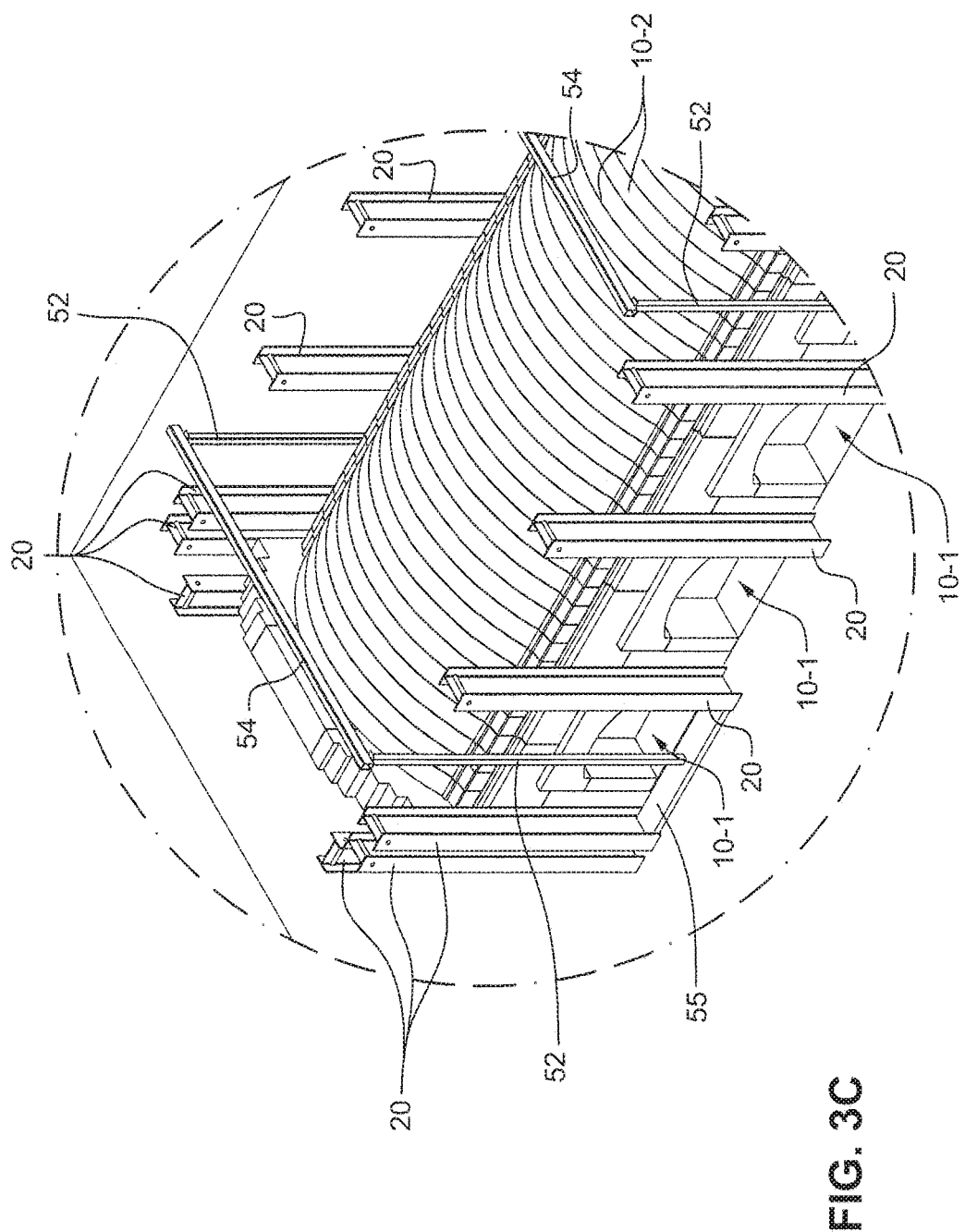
FIG. 3C is an enlarged perspective view similar to FIG. 3A but showing an installation sequence for the overhead crane apparatus.

FIGS. 3A-3D show a sequence by which the overhead crane apparatus 50 may be assembled relative to an existing regenerator structure 10. As was previously noted, the buck stays 20 are compressively held against the refractory blocks 12 forming the walls 16, 18 of the regenerator structure by means of tie rods 22. FIGS. 3A and 3B therefore show an existing regenerator structure 10 with the tie rods 22 in place. As is shown in FIG. 3C, the tie rods 22 have been removed and a foundation beam 55, upright support beam 54 and cross-support beam 56 installed as described previously. The particular sequence of removing the tie rods 22 and installation of the foundation beam 55, upright support beam 52 and cross-support beam 54 is not critical provided that there is no structural interference therebetween. Thus, the tie rods 22 can be removed before or after installation of the foundation beam 55, upright support beam 52 and cross-support beam 54 although it is typically preferred that the tie rods 22 be removed first as this ensures that they will not structurally interfere with any of the later installed beams.

Figure 3D:
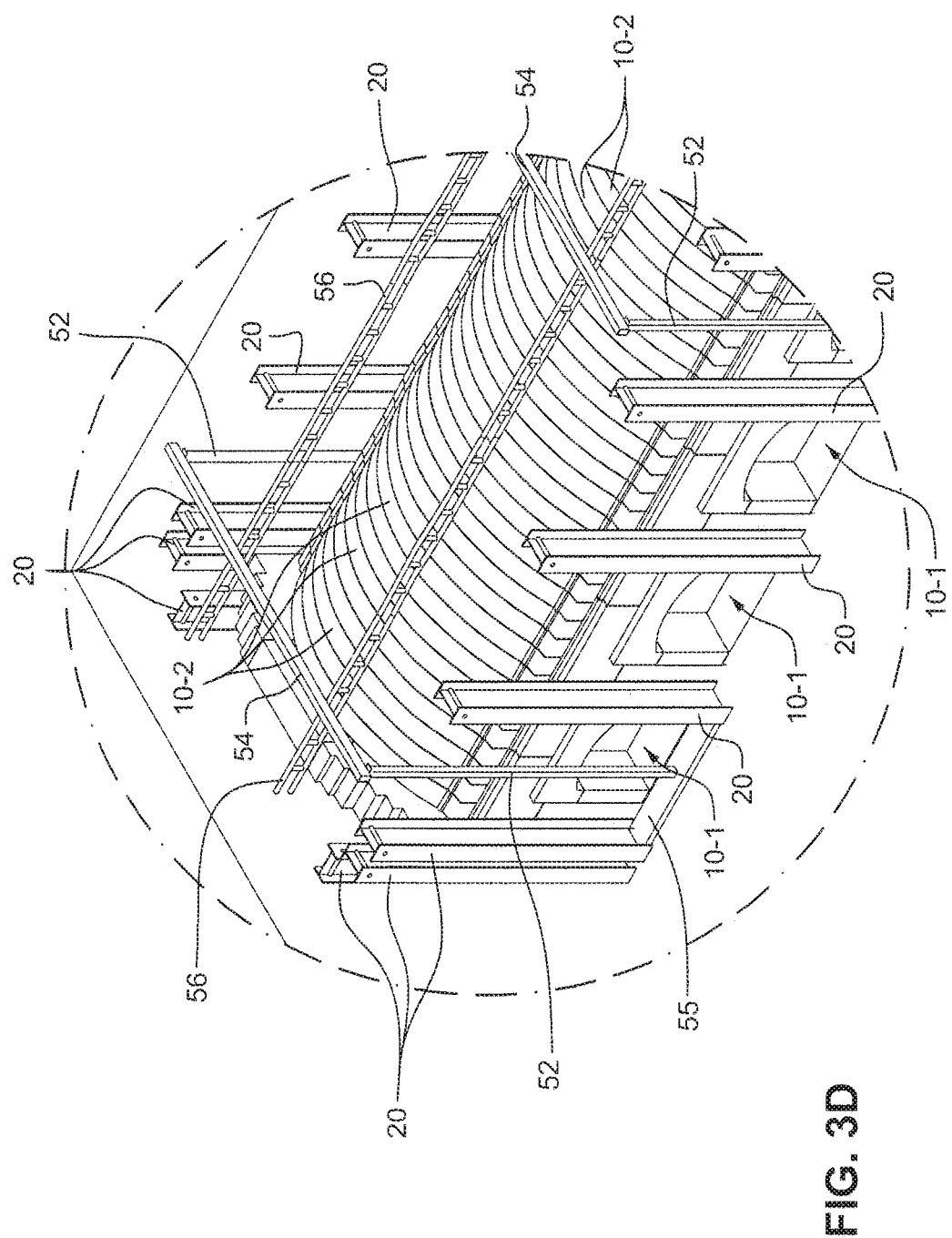
FIG. 3D is an enlarged perspective view similar to FIG. 3C but showing the overhead crane apparatus completely installed.

FIG. 3D shows the runway beams 56 having been installed by connection to the cross-support beams 54. Although not shown in FIG. 3D, the bridge beam 58 with the hoist 60 operatively connected thereto may likewise be installed onto the runway beams 56. Thereafter, the installation of the refractory blocks 12 and/or checker bricks 24 may proceed in the manner as previously described.

Figure 4:
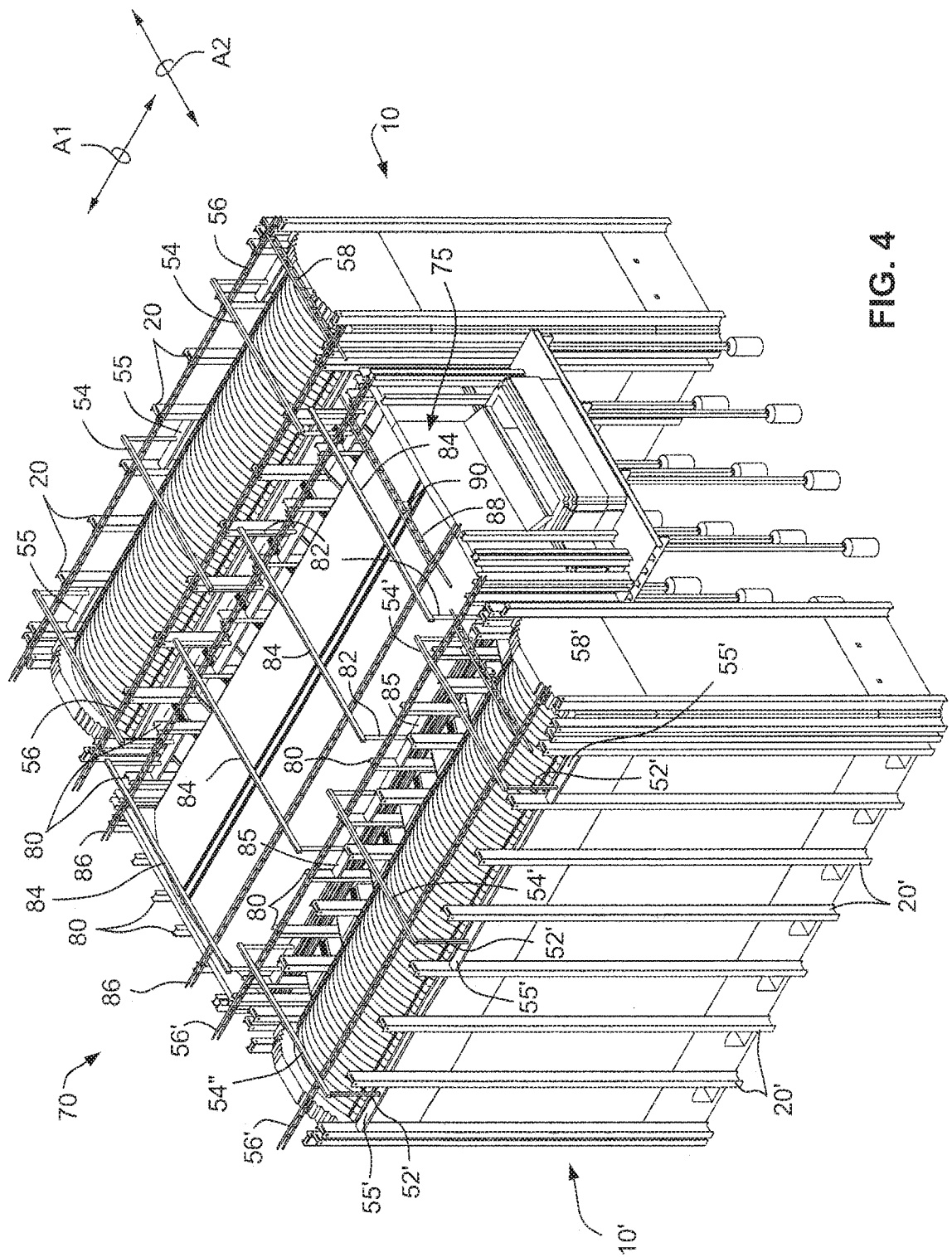
FIG. 4 is a perspective view of a cross-fired glass furnace system showing the apparatus in accordance with other embodiments of the present invention.

A cross-fired glass furnace system 70 is depicted in FIGS. 4-6 as being comprised of a central glass furnace structure 75 (e.g., a float furnace) and opposed pairs of regenerator structures 10, 10' operatively interacting with the furnace structure 75. Each of the regenerator structures 10, 10' are as described previously with reference to FIGS. 1-3D but are substantial mirror images of one another. Thus, corresponding structure described above with reference to regenerator 10 is shown by the same reference numeral in regenerator 10', but with a prime (') identifier. Thus, separate explanations of such corresponding structures for the regenerators 10, 10' will not be repeated.

The glass furnace structure 75, like the regenerators 10, 10', includes vertically oriented buck stays 80. The overhead crane apparatus employed for the glass furnace structure 75 is depicted as including laterally spaced-apart upright pairs of upright support beams 82 and a cross-support beam 84 spanning the distance therebetween. A foundation beam 85 extends between and is rigidly attached (e.g., by welding) to an adjacent pair of buck stays 80 so as to structurally support the upright and cross-support beams 82, 84.

The cross-support beams 82, 84 dependently support a pair of runway beams 86 between which is connected a travelling bridge beam 88. The bridge beam 88 includes an overhead travelling hoist 90. The runway beams 86 are preferably supported in a cantilever manner by the end-most upright and cross-support beams 82, 84 so that the terminal end portions extend beyond the end wall of the furnace structure 75 thereby enabling access to structural components to be hoisted by the travelling hoist 90.

Suitable operator controlled motors (not shown) are provided with the bridge beam 88 to allow it to reciprocally travel along the runway beams 86 in a longitudinal direction of the regenerator structure (i.e., in the direction of arrow A1 in FIG. 4). Similarly, operator controlled motors (not shown) are provided with the hoist 90 to allow it to travel reciprocally along the bridge beam in a latitudinal direction of the furnace structure 75 (i.e., in a direction of arrow A2 in FIG. 4).

Figure 10:
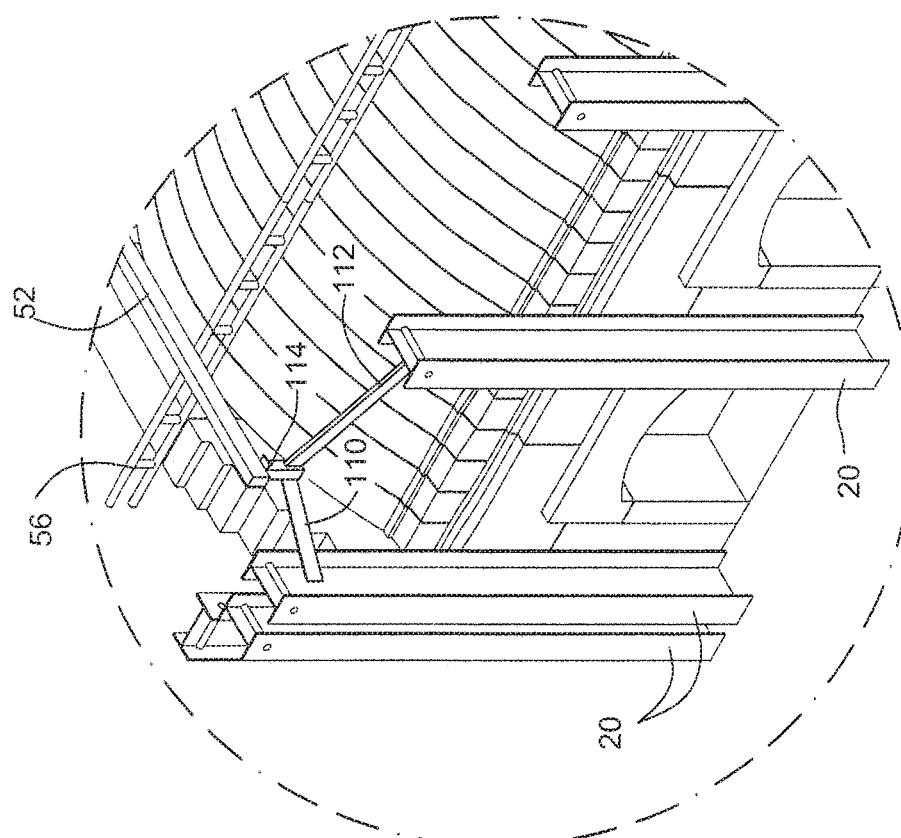
FIGS. 9-13 are respective schematic perspective views of alternative support arrangements according to other embodiments of the invention.
Figure 9:
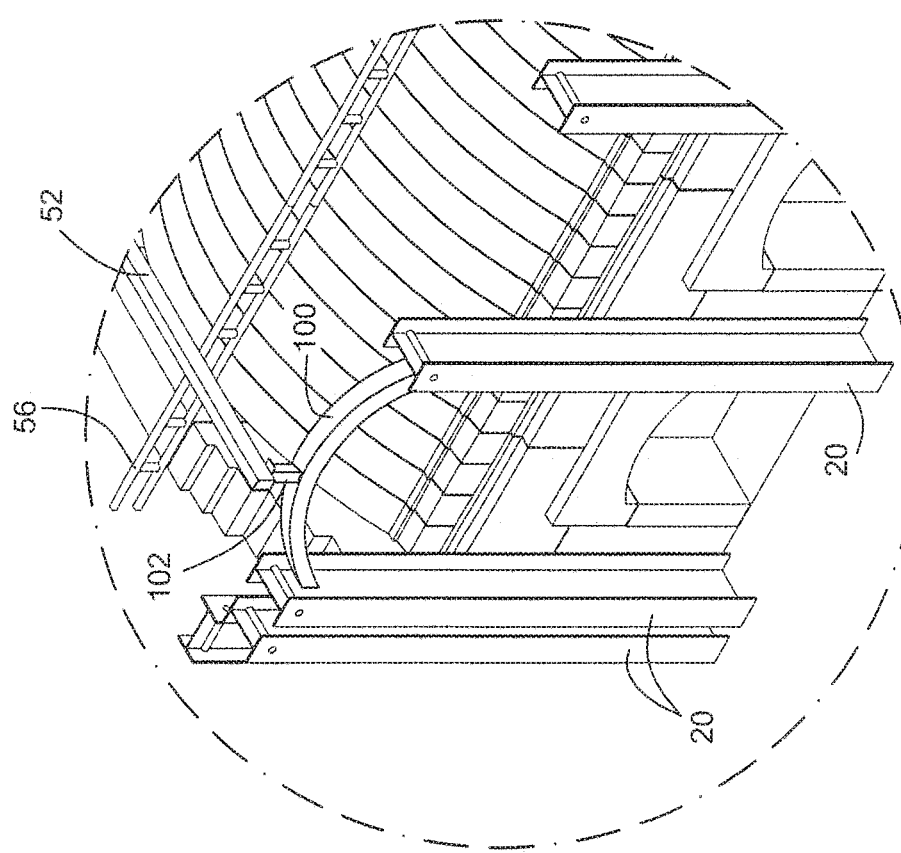

FIGS. 9 and 10 depict alternative embodiments for supporting the cross-supports beams 52, 52' of the regenerator structures 10, 10', respectively, and/or the cross-support beams 82 of the glass furnace structure 75. In this regard, FIGS. 9 and 10 are depicted in relationship to supporting the cross-support beams 52 the regenerator structure 10, but the disclosed embodiments are equally applicable to the regenerator structure 10' and the glass furnace structure 75.

As shown in FIG. 9, the cross-support beam 52 may be attached to an arched support member 100 which extends between and is rigidly connected to (e.g., via welding) an adjacent pair of buck stays 20. The cross-support beam 52 may be connected directly to an apex region of the arched support member 100. Alternatively, as depicted in FIG. 9, a pedestal support 102 may be provided extending upwardly from the apex region of the arched support member 100 to which an end of the cross-support beam 52 is attached.

In a similar manner, FIG. 10 shows another embodiment whereby a pair of upwardly convergent support members 110, 112 extend between and are rigidly connected to an adjacent pair of buck stays 20. The terminal ends of the convergent support members 110, 112 may be connected directly to one another and to an end of the cross-support beam 52 (e.g., by welding). Alternatively, as depicted the terminal ends of the convergent support members 110, 112 may be rigidly connected to an upwardly extending pedestal support 114 which in turn is connected to the cross-support support beam 52.

Figure 11:
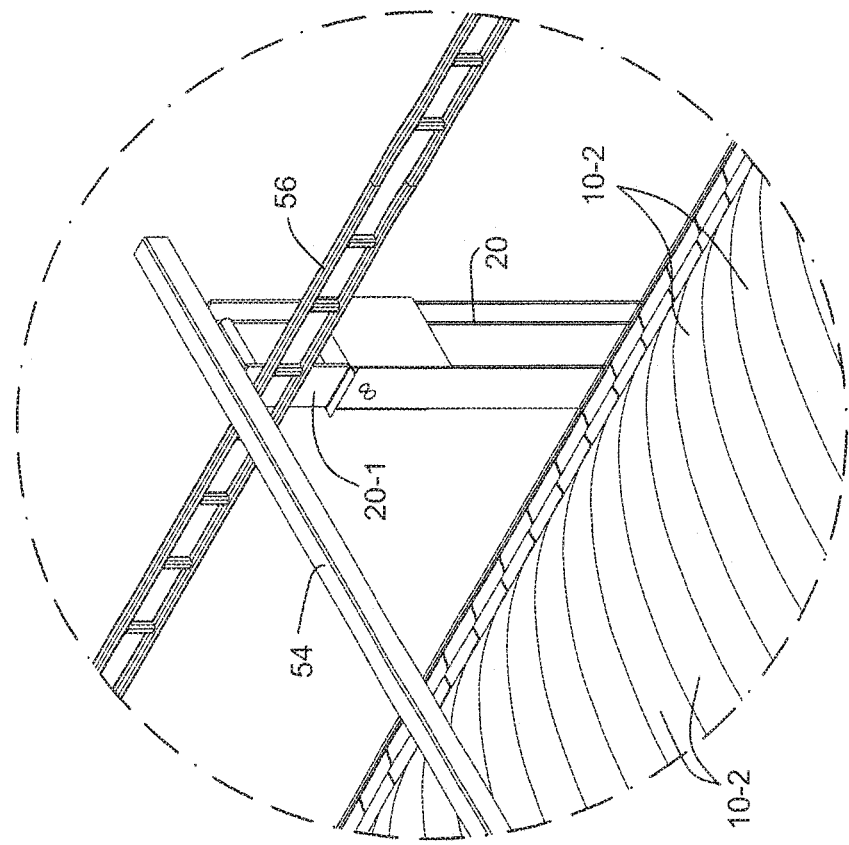

Another embodiment is depicted in FIG. 11 whereby a buck stay extension member 20-1 is rigidly fixed to (e.g., via welding) an upper terminal end of the buck stays. The cross-support beam 54 may therefore be rigidly fixed to opposing pairs of such extension members 20-1 so as to span the distance across the regenerator structure. The runway beams 56 may therefore be connected directly to the cross-support beams 54. According to the embodiment depicted in FIG. 11, therefore, the use of upright support beams 52 and foundation beams 55 is not necessarily required.

Figure 12:
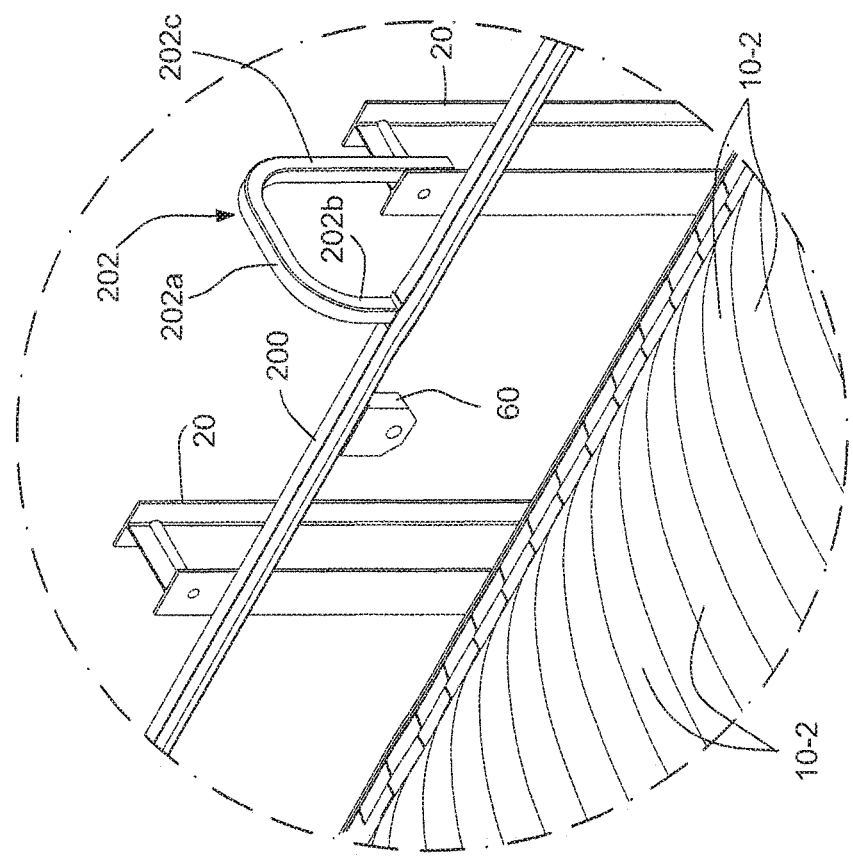
Figure 13:
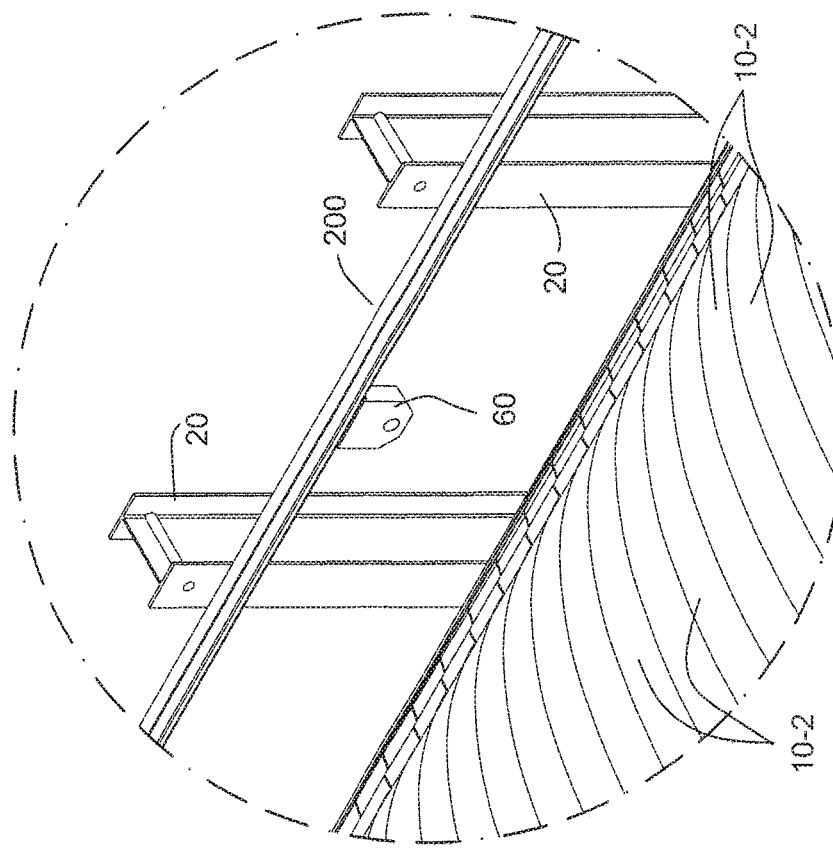

Accompanying FIGS. 12 and 13 depict embodiments of the invention which employ a monorail system. In this regard, as shown in FIG. 12, a monorail member 200 is attached to selected ones of the buck stays 20 by generally inverted U-shaped hangers 202. As shown, the hangers 202 include an outboard vertical leg 202a and an inboard vertical leg 202b connected to one another by a horizontal leg 202c. The monorail 200 is connected rigidly to the inboard leg 202b and supports a travelling hoist 60 of the variety discussed previously. The relative lengths of the legs 202a and 202b can be predetermined so as to accommodate varying height requirements that may be needed from one regenerator structure to another.

FIG. 13 is similar to the embodiment depicted in FIG. 12 except that the monorail 200 is connected rigidly to an inboard face of the buck stays 20.

Although the embodiments have been described in relation to a cross-fired glass furnace system, the principles of the invention may likewise be embodied in any glass furnace design, such as float furnaces, end-fired furnaces, unit melters with recuperators and electric furnaces with shelf, sidewall or bottom electrodes.

It will therefore be understood that the description provided herein is presently considered to be the most practical and preferred embodiments of the invention. Thus, the invention is not to be limited to the disclosed embodiments, but on the contrary, is intended to cover various modifications and equivalent arrangements included within the spirit and scope thereof.

What is claimed is:

1. A combination comprising:
   a refractory structure having an opposed pair of side walls and upright buckstays supporting the side walls; and
   a construction apparatus for positionally assembling structural components of the refractory structure, wherein the construction apparatus comprises:
   (i) an opposed plurality of foundation beams rigidly installed between respective longitudinally separated pairs of the buckstays adjacent the exterior surfaces of the opposed pair of side walls;
   (ii) opposed pairs of upright support beams positioned so that a lower end of a respective pair of upright support beams is rigidly connected to and supported by respective ones of the foundation beams and an upper end of the upright support beams extends upwardly above the opposed pair of side walls;
   (iii) cross-support beams latitudinally connecting respective upper ends of the opposed pairs of upright support beams such that the cross-support beams latitudinally span the interior space of the refractory structure;
   (iv) a pair of raceway beams which longitudinally extend relative to the refractory structure connected to the cross-support beams so that the raceway beams are dependently supported by the cross-support beams; and
   (v) a hoist assembly operably connected to the pair of raceway beams to allow the structural components of the refractory structure to be positionally assembled.

2. The combination of claim 1, wherein an end portion of the raceway beams extends in a cantilever manner beyond one of the end walls of the refractory structure.

3. The combination of claim 1, wherein the structural components are refractory blocks for assembly with the side walls of the refractory structure and/or checker bricks for assembly in an interior space of the refractory structure, and wherein the hoist assembly comprises:
   a bridge beam moveably mounted to the pair of raceway beams for reciprocal movements therealong in a longitudinal direction of the refractory structure; and
   a hoist moveably mounted to the bridge beam for reciprocal movements therealong in a latitudinal direction of the refractory structure.

4. The combination according to claim 1, wherein the foundation beams comprise an arch support extending between and connected to the respective longitudinally separated pairs of buckstay supports, wherein the upright support beams are attached to an apex of the arch support.

5. The combination according to claim 1, wherein the foundation beams comprise a pair of upwardly convergent supports extending between and connected to the respective longitudinally separated pairs of buckstays, wherein the upright support beams are attached to an apex of the convergent supports.

6. The combination according to claim 1, wherein the refractory structure further includes a port and an operator platform below the port, and wherein the foundation beams are rigidly positioned between the respective pairs of buck stays at or above the operator platform.

7. The combination according to claim 1, wherein the foundation beams are substantially horizontally installed between the respective longitudinally separated pairs of buckstays.

8. A method of forming the combination of claim 1 to allow positional assembly of refractory components to construct the refractory structure, wherein the method comprises the steps of:
- (a) rigidly connecting the opposed plurality of foundation beams between the respective longitudinally separated pairs of the buckstays adjacent the exterior surfaces of the opposed pair of side walls;
- (b) positioning the opposed pairs of upright support beams so that the lower end of the respective pair of upright support beams is rigidly connected to and supported by respective ones of the foundation beams and the upper end of the upright support beams extends upwardly beyond the side walls;
- (c) latitudinally spanning the refractory structure with the cross-support beams by connecting the cross-support beams between respective pairs of the upright support beams;
- (d) supporting the pair of raceway beams by the cross-support beams; and
- (e) operably installing the hoist assembly on the pair of raceway beams to allow the refractory components of the refractory structure to be positionally assembled.

9. The method according to claim 8, wherein step (d) comprises supporting the pair of raceway beams by the cross-support beams such that one end portion of the raceway beams is supported in a cantilever manner by a respective pair of the upright support beams and a cross support beam to thereby cause the one end of the raceway beams to extend beyond a respective end wall of the refractory structure.

10. The method according to claim 8, wherein step (a) comprises extending and connecting arch supports between adjacent pairs of the buck stays, and attaching the cross-support beams to an apex of a respective one of the arch supports.

11. The method according to claim 8, wherein step (a) comprises extending and connecting pairs of upwardly convergent supports between an adjacent pair of the buck stays, and attaching the cross-support beams to an apex of a respective one of the convergent supports.

12. The method according to claim 8, wherein the method further comprises operating the hoist assembly so as to position refractory blocks and/or checker bricks for assembly.

13. The method according to claim 8, wherein the refractory structure further includes a port and an operator platform below the port, and wherein step (a) comprises rigidly installing the foundation beams at a position between the respective pairs of buckstays which is at or above the operator platform.

14. The method according to claim 8, further comprising removing tie rods interconnecting the buck stays.

15. The method according to claim 8, wherein step (e) comprises:
- (e1) moveably mounting a bridge beam to the pair of raceway beams for reciprocal movements therealong in a longitudinal direction of the refractory structure; and
- (e2) moveably mounting a hoist to the bridge beam for reciprocal movements therealong in a latitudinal direction of the refractory structure.

* * * * *